United States Patent
Gavronsky et al.

[11] Patent Number: 5,829,492
[45] Date of Patent: Nov. 3, 1998

[54] HAND HELD INFLATING DEVICE

[75] Inventors: German Gavronsky, Stamford; Gerard Anthony Cahalan, Farmington; Abraham N. Reichental, Southbury, all of Conn.

[73] Assignee: Sealed Air Corporation, Saddle Brook, N.J.

[21] Appl. No.: 773,759

[22] Filed: Dec. 24, 1996

[51] Int. Cl.[6] .................................................. B65B 31/04
[52] U.S. Cl. .............................. 141/96; 141/67; 141/348; 141/68; 141/313; 137/223; 137/227
[58] Field of Search ................................. 141/67, 68, 95, 141/96, 10, 313, 348–350; 137/223, 227, 229

[56] References Cited

U.S. PATENT DOCUMENTS

| | | | |
|---|---|---|---|
| 2,324,544 | 7/1943 | Sutcliffe et al. | 137/229 |
| 2,501,801 | 3/1950 | Wallin | 137/229 |
| 2,635,623 | 4/1953 | Moffett | 137/229 |
| 4,102,364 | 7/1978 | Leslie et al. | 141/10 |
| 4,146,069 | 3/1979 | Angarola et al. | 141/68 |
| 4,146,070 | 3/1979 | Angarola et al. | 141/68 |
| 5,042,541 | 8/1991 | Krier et al. | 141/313 |
| 5,159,961 | 11/1992 | Snetting et al. | 141/10 |
| 5,566,728 | 10/1996 | Lange | 141/10 |

*Primary Examiner*—J. Casimer Jacyna
*Attorney, Agent, or Firm*—Bell Seltzer Intellectual Property Law Group of Alston & Bird LLP

[57] ABSTRACT

There is provided a device for filling an inflatable protective cushion to a predetermined air pressure. The inflating device has a handle having an inlet port for receiving compressed air and a valve for opening and closing the inlet port and an air outlet port. A housing having an air chamber is connected to the handle and receives the air from the handle outlet port through an air channel terminating in an orfice which creates a vacuum in the chamber. The venturi effect draws additional air through a muffler connected to the housing chamber during filling. The muffler serves to restrict air flow from and to the atmosphere during and after filling of the cushion. The housing also includes a nozzle connected to the air outlet for insertion into a self-sealing valve in the cushion for filling with air. Also provided is a fill indicator comprising an indicator mount secured in the housing, an indicator button extending through an opening in the mount and moveable upward and downward therein. A magnet is attached to the inner end of the indicator button and a means for attracting the magnet when the cushion is being filled with air is provided. The indicator button rises when the force of redirected air overcomes the magnetic force after the cushion reaches the desired air pressure.

8 Claims, 2 Drawing Sheets

HAND HELD INFLATING DEVICE

BACKGROUND OF THE INVENTION

The present invention relates to a device for inflating protective cushioning material. More particularly the present invention relates to a hand held device for inflating protective cushioning material which effectively eliminates overinflation of the protective cushion.

When articles are packaged in a container or box for shipping there frequently are void spaces in the container between the article and the container walls. Protective packaging for articles of different sizes and shapes is commonly used to cushion articles. One preferred type of protective packaging is an inflatable cushion formed from a pair of thermoplastic sheets that have been juxtaposed one upon the other and sealed around their peripheral edges to form the cushion. The cushions have a seaf-sealing valve in either one of the walls of the cushion or affixed to one of the peripheral edges. The cushions are inflated by inserting the nozzle of an inflating device into the valve and inflating with air. An example of such protective packaging is shown in U.S. Pat. No. 5,348,157.

Inflating devices are typically used to inflate the inflatable cushions with compressed air. The nozzle of the inflating device is inserted through a valve, usually a self-sealing valve, in the inflatable chamber and compressed air is passed through the nozzle into the chamber.

One of the difficulties that an operator has when filling an inflatable protective cushion is determining when the proper amount of air pressure in the cushion has been reached. If the cushions are inflated under high pressure, unless the pressure is carefully regulated, it is quite easy to overinflate the cushion causing it to rupture. On the other hand, if low pressure air is used, the time required for filling the protective cushion to the desired pressure can be excessively long. Furthermore, the use of low pressure air does not eliminate the possibility of overinflation of the cushion.

There remains a need for providing a hand held inflating device which can be used without any need to be concerned about overinflation of the cushion.

SUMMARY OF THE INVENTION

It is an object of the present invention to provide a protective cushion inflating device which essentially eliminates overinflation of the cushion.

Another object of the present invention is to provide an inflating device which indicates when an inflatable protective cushion has reached a predetermined pressure.

It has been found that these objects are accomplished by the present invention in which there is provided a hand held inflating device for filling an inflatable protective cushion with a predetermined air pressure. The device includes a handle having an inlet port for receiving compressed air and an on-off valve operated by a trigger for controlling the air passing through the inlet port and out through an air outlet port. A housing is connected to the handle. The housing has an air channel mating with the handle air outlet port. The air channel terminates with an orifice located in the housing. Air flows from the orifice into a chamber causing a vacuum in the chamber which draws additional air from the atmosphere through a muffler attached to the housing and out a nozzle. The nozzle is connected to the outlet in the chamber and is used for insertion into the inflatable protective cushion for filling it with air. When the cushion is filled to the desired pressure the air is redirected in a controlled manner back through the muffler which quietly dispenses the diverted air to the atmosphere. A pressure regulator is provided, preferably connected near the discharge of the air hose into the handle of the device, to regulate the air entering the handle.

In another embodiment of this invention there is provided a fill indicator which is a pop-up button that rises when the protective cushion has been inflated with a predetermined inflation pressure in the cushion. The fill indicator includes an indicator mount secured in the housing through an opening in the top of the chamber. The indicator mount has an opening extending therethrough. An indicator button extends through the opening in the indicator mount and is moveable upward and downward therein. A magnet is attached to the inner end of the button and there is provided a means for attracting the magnet downward toward a position in the chamber. A preferred means for attracting the magnet is a metallic rod or screw inserted through the housing wall into the chamber and positioned so that the magnet rests on the rod while the protective cushion is being filled with air. The indicator button rises upward through the opening in the indicator mount when the force of redirected air overcomes the magnetic force after the cushion reaches the desired air pressure.

BRIEF DESCRIPTION OF THE DRAWINGS

Other objects, features and advantages of the present invention will become apparent from the following detailed description taken in conjunction with the drawings in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
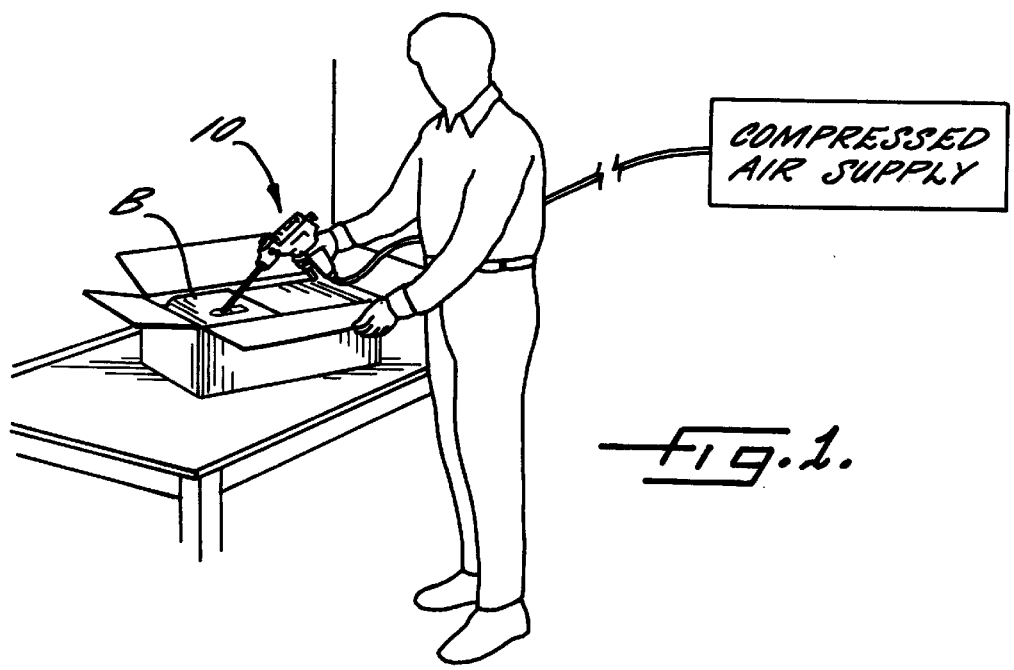
FIG. 1 is an environmental view of a worker inflating an inflatable cushion using a hand held inflating device of the present invention.

Referring now to FIG. 1 there is shown an operator using the inflating device 10 of the present invention to inflate a protective cushion B. As shown, the article to be protected is placed in a shipping container such as a box made of corrugated fiberboard. The uninflated protective cushion B having a self-sealing valve is placed in the box in a void space. The nozzle of the inflating device is inserted into the self-sealing valve and inflated to a predetermined pressure whereupon the button rises indicating the cushion is full of air and the nozzle is removed from the valve. The inflating device may be used to inflate cushions either after they are placed in the container void space beside an article or outside of the container and then placed in the void space.

Figure 2:
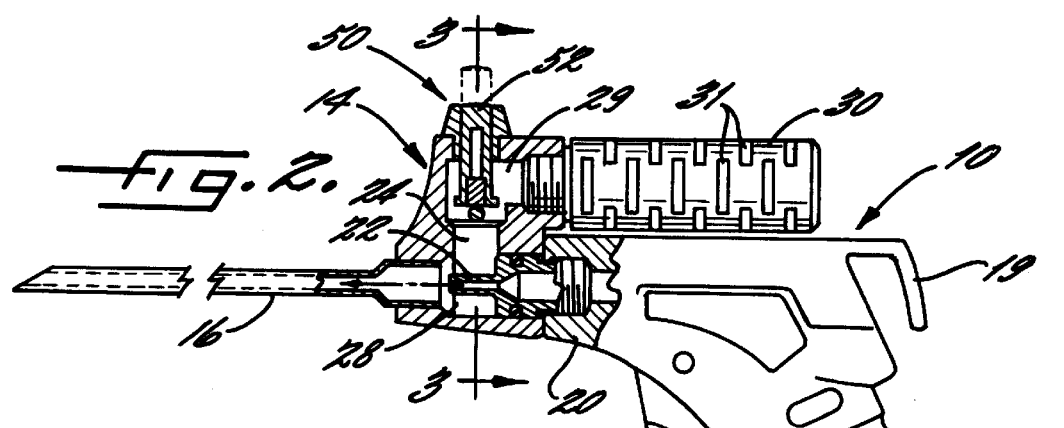
FIG. 2 shows a side view of the inflating device of the present invention.

As shown in FIG. 2, the inflating device 10 has a handle 12, a housing 14 and a nozzle 16. The handle 12 has an inlet port 17 provided at the inlet end of the handle for permitting connection to a pressurized gas supply, such as compressed air, usually through a hose. An on-off valve (not shown) is provided within the handle and downstream of the inlet port 17 and is operated by a pivoted handle, trigger 18. Preferably, the valve is spring biased to prevent the pressurized gas from flowing through the device from the inlet port but may be opened, at the will of the operator, by squeezing the trigger 18. The valve may be of conventional design. The handle 12 also includes an air outlet port through which the air passes into the housing 14. The handle may also have a hook 19, which as shown in FIG. 2, is located on the rear of the handle 12 and is used to hang the hand held inflating device from a holder placed near the packaging area for convenience when not in use.

Figure 4:
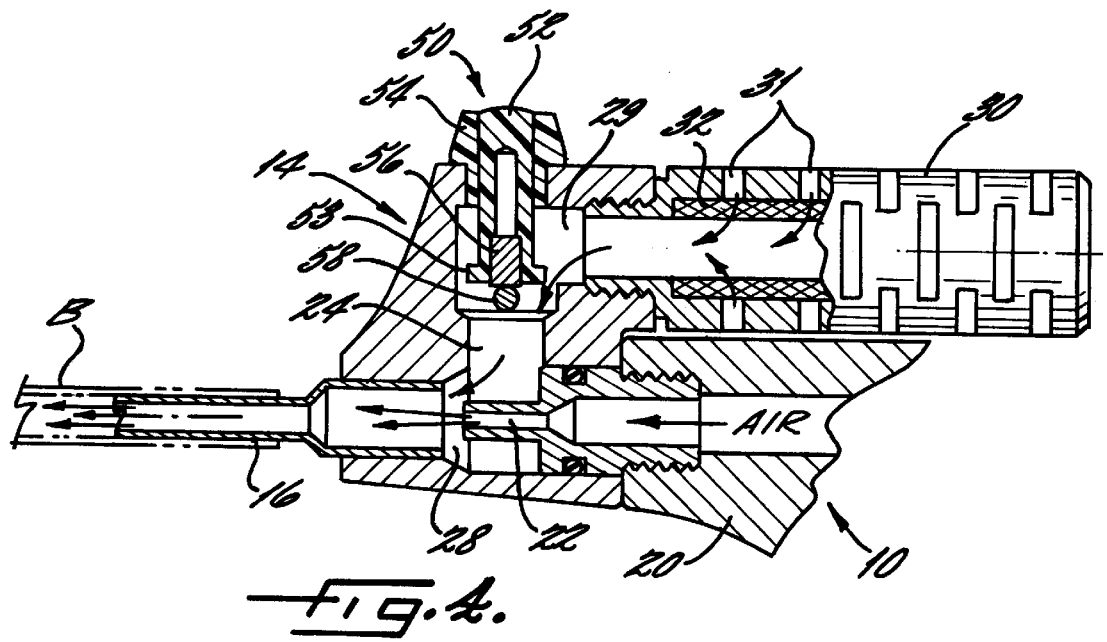
FIG. 4 illustrates an enlargement of the housing of the inflating device of the present invention showing the air flow through the chamber as the cushion is being filled with air and showing the indicator button in a downward position.

The housing 14 is connected to or may be a unitary part of the handle 12 and includes air channel 20 through which air passes from the handle air port. The air channel 20 terminates at a means for obtaining a vacuum in chamber 24. The vacuum may be created by a venturi-like or conda effect using orifice 22 to compress the air as it passes through the orifice and into the chamber 24 which draws additional air from the atmosphere through muffler 30 during filling of protective cushion B, as shown in FIG. 4. The housing 14 has an air outlet 28 located in the housing wall opposite the orifice 22. A nozzle 16, connected to the air outlet 28, is used for insertion into the self-sealing valve of the cushion for filling the protective cushion with air. The mouth of the nozzle may be tapered, as shown, for easy insertion into the self-sealing valve. The shape of the nozzle may be any number of shapes such as round or oval.

Figure 5:
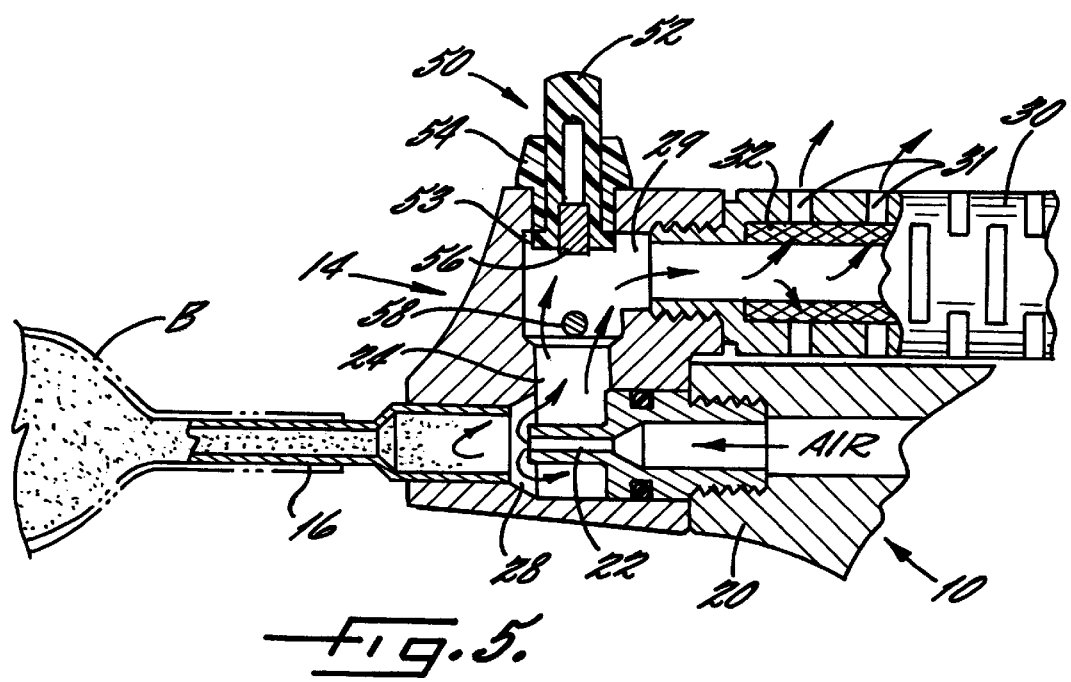
FIG. 5 illustrates an enlargement of the housing of the inflating device of the present invention showing restricted the air flow back through the chamber and out the muffler after the cushion has reached the desired air pressure and the indicator button in raised position.

As shown in FIG. 5, when the protective cushion B is filled to the desired pressure, a redirection of incoming air around the orifice 22 results in directing the air into the upper portion of the chamber and out through opening 29 into muffler 30 and then to the atmosphere. The muffler 30 is attached to the housing 14 at the opening 29 to control outgoing air once the desired inflation pressure has been reached. The inflation pressure may vary depending upon the design of the cushion. The predetermined pressure may be maintained by the interaction of a pressure regulator of conventional design attached to the compressed air hose, orfice size and the degree of air flow restriction provided by the muffler.

Figure 3:
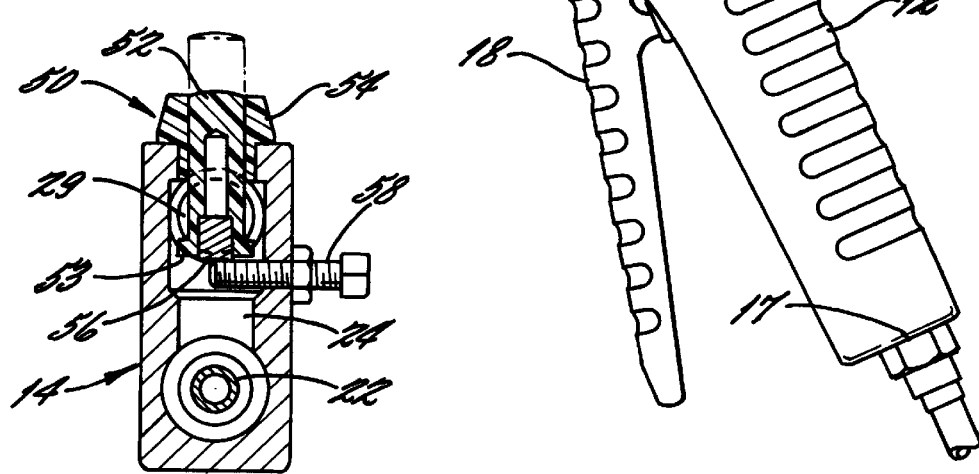
FIG. 3 shows a front view of the inflating device taken along line 3—3 of FIG. 2.

It is not always possible for an operator to know exactly when the cushion has been filled with the proper amount of air. Therefore, in another aspect of this invention, there is provided a fill indicator 50. As shown in FIG. 3, there is a pop-up fill indicator 50 located in the upper portion of the housing 14. The fill indicator 50 includes an indicator mount 54 secured in the housing 14 through an opening in the top of the chamber 24. The indicator mount 54 has an opening extending therethrough. An indicator button 52 extends through the opening in the indicator mount 54 and is moveable upward and downward therein. The button 52 has a magnet 56 attached to its inner end. In a preferred embodiment the button 52 has an outwardly extending flange 53 surrounding its lower end to maintain the button within the indicator mount when fully extended. The magnet 56 is attracted to a rod 58 inserted through the wall of housing 14. The rod may be in the from of a screw or the like and is adjustable as to its length in order to provide the desired amount of attraction to the magnet. When the proper amount of inflation is obtained, there is sufficient air pressure exerted against the base of the magnet, caused by diverted air leaving through muffler 30, to force the button to rise through the top of the housing indicating to the operator that the cushion is fully inflated. It is desirable that the indicator button pop-up instantaneously as soon as the cushion has reached the desired air pressure. Thus, it is preferrable that the indicator button be made of lightweight material.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A hand held device for filling an inflatable protective cushion with air comprising:

a handle having a gas inlet port for receiving compressed air and a trigger for opening and closing said inlet port and an air outlet port;

a housing connected to said handle comprising; a chamber for receiving air; an air channel mating with said handle air outlet port and terminating in an orifice adapted to create vacuum in said chamber, an air outlet, a muffler attached to said housing for restricting air flow from and to the atmosphere during and after filling of said cushion; and a fill indicator to indicate when said protective cushion has reached a predetermined air pressure; and a nozzle connected to said outlet for insertion into said cushioning bag for filling said bag with air.

2. The device according to claim 1 wherein said fill indicator comprises an indicator mount having an opening extending therethrough and secured to said housing through an opening in the top of said chamber; a button extending through said opening in said indicator mount and moveable upward and downward therein; a magnet attached to the inner end of said indicator button; and a metallic rod inserted through a wall in said housing, said magnet resting on said rod.

3. The device according to claim 2 wherein said button has an outwardly extending flange surrounding its lower end.

4. A device for filling an inflatable protective cushion with air comprising:

a handle having a gas inlet port for receiving compressed air and a trigger for opening and closing said inlet port and an air outlet port;

a housing connected to said handle comprising; a chamber for receiving air; an air channel mating with said handle air outlet port and terminating in a means to create vacuum in said chamber, an air outlet, a muffler attached to said housing for restricting air flow from and to the atmosphere during and after filling of said cushion; and a fill indicator to indicate when said protective cushion has reached a predetermined air pressure; and a nozzle connected to said outlet for insertion into said cushioning bag for filling said bag with air;

said fill indicator comprising an indicator mount having an opening extending therethrough and secured to said housing through an opening in the top of said chamber;

a button extending through said opening in said indicator mount and moveable upward and downward therein;

a magnet attached to the inner end of said indicator button; and means for attracting said magnet.

5. The device according to claim 4 wherein said means for attracting said magnet is a metallic rod inserted through a wall in said housing, said magnet resting on said rod.

6. The device according to claim 4 wherein said button has an outwardly extending flange surrounding its lower end.

7. The device according to claim 4 wherein said air channel terminates in an orifice.

8. The device according to claim 4 wherein said device is hand held.

* * * * *